April 10, 1962

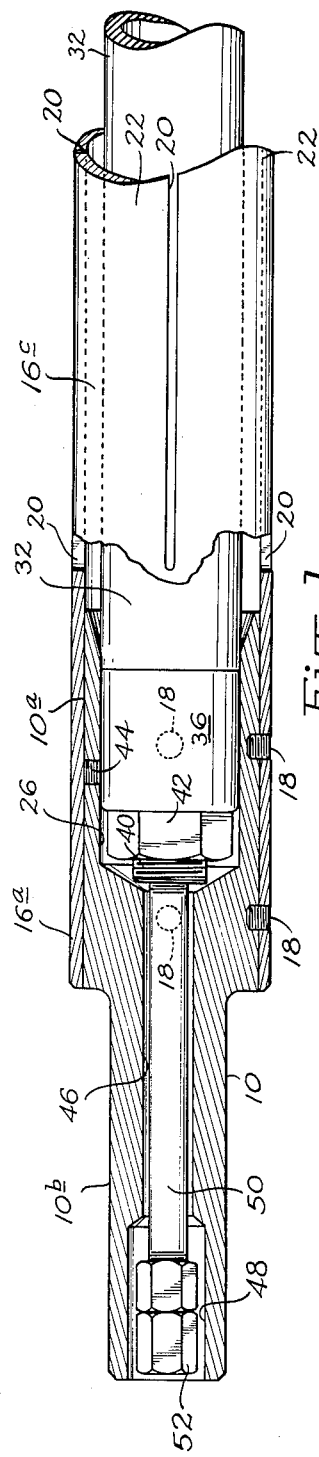
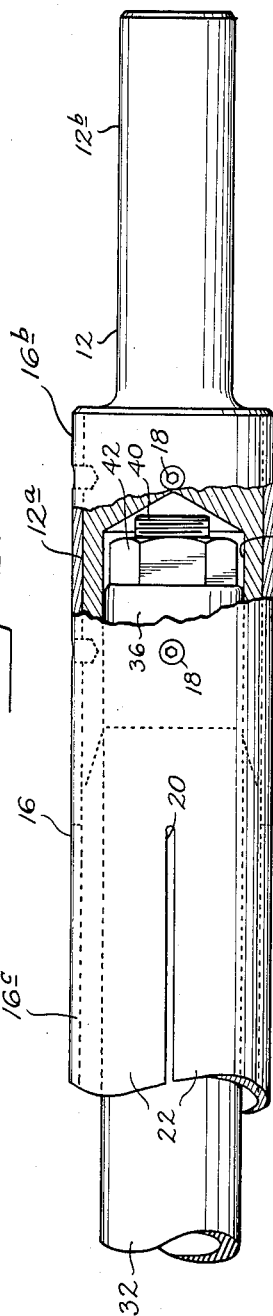
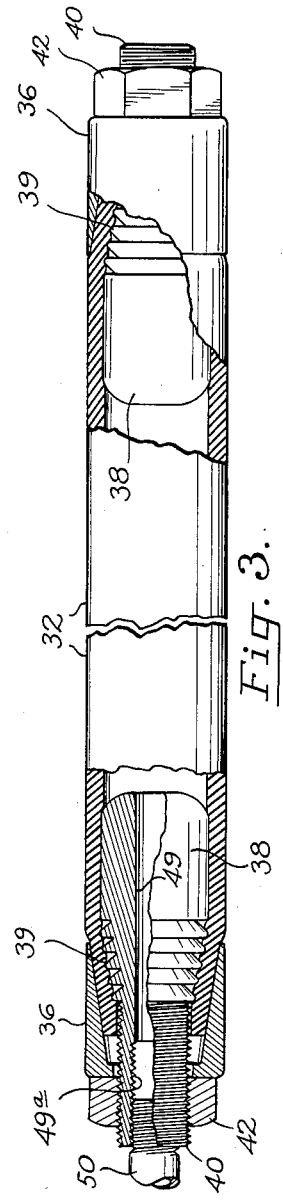

A. T. WILLIAMS ETAL 3,029,037

EXPANDABLE SHAFT

Filed May 10, 1960

Arthur T. Williams
Charles R. Tidland
INVENTORS

BY Ramsey and Kolisch
Attys.

United States Patent Office 3,029,037
Patented Apr. 10, 1962

3,029,037
EXPANDABLE SHAFT
Arthur T. Williams and Charles R. Tidland, both of
P.O. Box 1014, Camas, Wash.
Filed May 10, 1960, Ser. No. 28,086
2 Claims. (Cl. 242—72)

This invention relates to expandable shafts of the type that may be used in winding and rewinding paper rolls, the invention, however, not being limited to specific use as a paper rewind shaft but also being important in related industries where expandable shafts are employed. In a more specific sense, the invention concerns improvements in the mechanism producing expansion in the shaft.

According to this invention, the shaft comprises an elongated, substantially cylindrical member adapted to be positioned along the axial center of a roll thus to mount the roll. A portion of this cylindrical member intermediate its ends is slotted, and by reason of these slots is radially outwardly expandable when pneumatic means or other fluid-pressure-operated means exerts suitable radial outward pressure thereon. Expansion radially of the intermediate portion is accompanied by a slight bowing outwardly of the walls of the cylindrical member, and an axial drawing together of the ends of the member.

It is an object of the invention to provide an improved construction for such an expandable shaft having a cylinder member which is radially expandable intermediate its ends wherein the ends of this member are secured to nonintegral and axially spaced journal portions, such being axially shiftable toward each other with drawing together of the cylinder ends. The construction contemplated is relatively simple, and has been found capable of handling rolls of substantial size without excessive deformation of the intermediate expandable portion of the cylinder member.

Another object is to provide in such a shaft a novel construction for the fluid-pressure-operated expansion mechanism for producing outward expansion of the intermediate portions of an expandable cylinder member, wherein the supply conduit for supplying fluid under pressure to the expansion mechanism is readily accessible but fully protected from inadvertent damage.

Another object is to provide novel fluid-pressure-operated expansion mechanism for an expandable shaft which comprises an elongated inflatable member secured at opposite ends to axially shiftable journal portions, whereby the ends of the inflatable member and the journal portions may shift as one. A related feature is to provide supply conduit means in such an organization mounted in fixed position relative to a journal portion and protected in this position by covering walls that shield the conduit means.

Still another general object is to provide an improved construction for an expandable shaft which comprises a rigid through shaft mounting an elongated, radially expandable cylindrical member, wherein provision is made for axial play in the ends of the cylindrical member, and which comprises novel means for mounting these ends inhibiting skewing or bending of the cylindrical member and functioning during operation of the shaft to center the through shaft within the cylindrical member.

Other objects and advantages are attained by the invention, which is described hereinbelow in conjunction with the accompanying drawings, wherein:

FIG. 1 is a side view of one end of an expandable shaft, constructed according to an embodiment of the invention, and with portions removed to illustrate details of construction;

FIG. 2 is a view of the other end of the shaft shown in FIG. 1, also with portions removed;

FIG. 3 illustrates part of the fluid-pressure-operated expansion mechanism present in the shaft for producing radial expansion, with portions removed;

Figure 4:
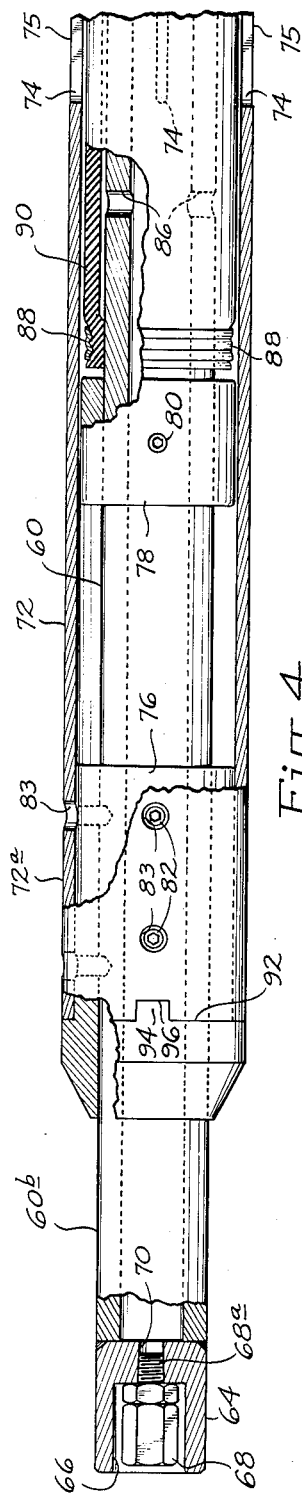
FIG. 4 is a view similar to FIG. 1 but illustrating an end of an expandable shaft according to another embodiment of the invention.

Referring now in particular to FIGS. 1, 2, and 3 illustrating one modification of this invention, the numerals 10 and 12 indicate a pair of nonintegral shaft journal portions or stub journals, substantially axially aligned and spaced axially one from the other. These journal portions have opposed inner ends constituting mounting ends indicated at 10a, 12a, and outer ends 10b, 12b of smaller diameter than the inner ends employed in mounting the shaft in the usual installation.

Extending between journal portions 10, 12 is an elongated, one-piece hollow cylinder or sleeve member 16. Member 16 constitutes a roll-contacting means in the shaft construction. The member is concentric with portions 10, 12, and has ends 16a, 16b extending over and snugly fitted about inner ends 10a, 12a of the journal portions. These ends are secured in fixed position on the journal portions as by set screws 18.

Over an intermediate portion 16c of member 16 and extending longitudinally therealong are elongated slots 20. These are equally circumferentially spaced about the perimeter of the cylinder member. The slots divide the intermediate portion into elongated strip portions 22, that are free to bow outwardly when a radially outwardly directed pressure is exerted on their inner sides. Thus the slots function to weaken the intermediate portion to accommodate radial expansion of the portion. It should be noted that the slots terminate short of ends 16a, 16b encircling the inner ends of the journal portions, and thus these ends constitute cylindrical skirt portions operating to center cylindrical member 16 on the stub journals.

Each of the stub journals 10 and 12 is provided at its inner end with an axially extending cylindrical cavity, indicated at 26 and 28, respectively. Extending between these cavities with opposite ends mounted therewithin is an elongated fluid-pressure-expanded hose or inflatable member 32 of flexible material. The ends of this hose are closed by fittings or closure mechanism to be described, and mounted in fixed position on the stub journals.

Specifically, the closure mechanism at each end of the hose takes the form of an encircling cap 36 fitted over the hose end. Within the hose end is a plug or core portion 38. Plug 38 has a tapered, knurled end 39, that is drawn tightly against the inside of the hose end and functions to wedge the wall of the hose against the inside of cap 36. Screwed tightly down on a threaded portion 40 of plug 38 is a nut 42, used in drawing the plug into the cap. The cap itself is mounted in fixed position within its cylindrical cavity by set screws 44 mounted in suitable threaded bores provided in the stub journal. Thus, the hose ends are secured against relative axial movement with respect to the stub journals.

One of the stub journals (stub journal portion 10) is provided with an axially extending bore 46. This leads from the inner end of cavity 26 to the inner end of a recess 48 indented inwardly from the outer end of stub journal 10. The plug 38 for the end of hose 32 within stub journal 10 is provided with a bore 49 which is threaded at 49a, and screwed into this threaded portion is the threaded end of a tube or conduit 50. The outer end of tube 50 is located in recess 48, and is provided with a conventional air valve 52. The tube and valve constitute means for admitting fluid under pressure (air)

to hose 32. It should be noted that the wall portions defining recess 48 at all times encompass and shield the outer end of the tube 50 and the valve. Since the tube is fixed to plug 38, the tube and valve are fixed against relative movement with respect to the stub journal, and this shielding relationship exists at all times.

Explaining the operation of the expandable shaft just described, to radially expand the intermediate portion of cylinder or sleeve 16, fluid under pressure is admitted through the tube 50 into hose 32, causing the hose to extend radially along its length and bear against the inside of strip portions 22. This produces outward bowing of these strip portions. The hose tends to be self-centering within the cylinder 16. Accompanying bowing of the strip portions is a slight axial shifting of the stub journals axially toward each other, since the end or skirt portions of the cylinder 16 are fixed to the stub journals. Note that cylinder 16 in effect constitutes an expandable means, and also a structural part joining the journal portions. With the hose inflated, rigidity is imparted to the shaft enabling it to carry substantial loads.

Figure 5:
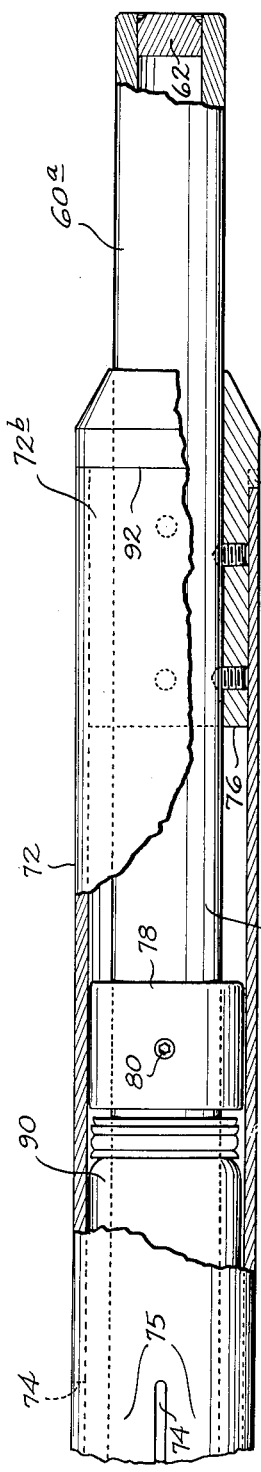
FIG. 5 shows the other end of the shaft illustrated in FIG. 4, with portions removed.

Referring now to the embodiment illustrated in FIGS. 4 and 5, in this embodiment there is provided a through shaft 60 with end portions 60a, 60b that constitutes journal portions in the construction. In the form of the invention illustrated, the shaft is hollow, and is closed at one end by a plug 62 welded within the shaft, and at its other end by a plug 64. Plug 64 is provided with a recess 66 indented inwardly from its outer end, similar to recess 48. Air valve 68 is mounted on plug 64 by screwing a threaded end 68a into an accommodating internally threaded bore 70. Bore 70 communicates with the interior of shaft 60.

Concentric with the through shaft and extending along an intermediate portion of the shaft is a cylinder member 72. As in the case of the first embodiment, member 72 contains slots 74 over a portion intermediate its ends, and these slots define expandable strip portions 75 extendnig along this intermediate portion. Ends 72a, 72b of the cylinder member are nonslotted and substantially nonperforate, and thus constiute skirt portions in the construction.

Centering each end of the cylinder member on the through shaft are a pair of centering sleeves, indicated at 76 and 78. The inner sleeve 78 is fixed in place on the shaft 60 by set screws 80, and the outer sleeve 76 is fixed in place by set screws 82. Clearance holes in the cylinder member for screws 82 are indicated at 83. The sleeves have considerable width and are spaced axially on the through shaft, and thus constitute means extending over a substantial portion of the shaft holding the cylinder member concentric and inhibiting bending of the member. Sleeves 78 are covered by the cylinder member at all times, and so also are major portions of sleeves 76.

Bores 86 are provided in the through shaft connecting with the hollow center thereof. Concentric with the shaft and clamped thereon by clamps 88 is a hose 90 of flexible material. The bores communicate with the interior of the hose in the space bounded at the ends by the clamps, and thus the bores provide a means for introducing fluid under pressure to the hose from the interior of shaft 60. In setting up the shaft, sleeves 78 are shifted as close as possible to the ends of hose 90, whereby they may produce maximum stability from bending in the cylinder member.

The outer sleeves have annular flanges 92 that limit axial shifting of the cylinder member on the through shaft. Integral with these flanges are lugs 94 protruding into cutouts 96 provided the ends of cylinder member 60. The lugs and cutouts key the cylinder member to the sleeves 76 and the through shaft so that all rotate together. As in the case of the first embodiment, radial expansion of the intermediate portion of the cylinder member is accompanied by axial inward movement of its ends. Such shifting is accommodated by the lugs 94, without the lugs moving completely out of cutouts 96, so as to lose the key connection between the cylinder member and through shaft.

In the embodiment of the invention just described, air or other fluid under pressure is introduced to the center of the shaft 60 and the interior of hose 90 through valve 68 and bore 70. The valve at all times is shielded by the walls defining recess 66. With expansion of the hose, the slotted portion of member 72 tends to center itself on the through shaft. The ends of the cylinder member 72 are always centered by the centering sleeves.

It is claimed and desired to secure by Letters Patent:

1. In an expandable shaft, a pair of axially spaced substantially aligned shaft journal portions having outer ends and opposed inner mounting ends, an elongated hollow cylinder concentric with and extending between said journal portions and having its ends fixedly secured on said mounting ends of said journal portions, said cylinder having a portion intermediate its ends that is radially expandable, elongated fluid-pressure expandable hose means mounted within said cylinder having closed ends adjacent the mounting ends of said journal portions that are movable toward each other on expansion of the hose means, means fixing the closed ends of said hose means to the mounting ends of said journal portions, and means for supplying fluid under pressure to the hose means thereby to expand the hose means, said hose means on its expansion operating to expand the radially expandable portion of said cylinder and to shift the ends of the cylinder and said journal portions toward each other.

2. The shaft of claim 1, wherein said hose means has each end closed off by means including a plug member, and the means for supplying fluid under pressure to said hose means comprises a bore extending axially through one of said shaft journal portions and opening to the interior of said cylinder adjacent one end of said hose means, a hollow tube mounted within said bore, and means securing one end of said tube to the plug member closing off said one end of said hose means with the interior of said tube connecting with the interior of said hose means.

References Cited in the file of this patent
UNITED STATES PATENTS

| | | |
|---|---|---|
| 765,109 | Sticker | July 12, 1904 |
| 2,145,806 | Schnedarek | Jan. 31, 1939 |
| 2,289,519 | Randall | July 14, 1942 |
| 2,537,492 | Tidland | Jan. 9, 1951 |
| 2,552,077 | Williams et al. | May 8, 1951 |
| 2,621,867 | Grettve | Dec. 16, 1952 |
| 2,711,863 | Grettve | June 28, 1955 |
| 2,876,961 | Cole et al. | Mar. 10, 1959 |

FOREIGN PATENTS

| | | |
|---|---|---|
| 163,738 | Australia | June 29, 1955 |